G. VINCENT.
Presser-Foot Attachment for Sewing-Machines.
No. 134,497. Patented Dec. 31, 1872.
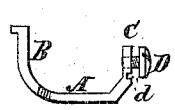 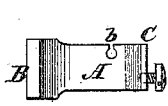 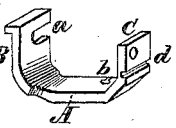  
Fig.1. Fig.2. Fig.3. Fig.4. Fig.5.
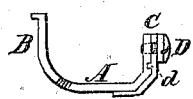  
Fig.6. Fig.7. Fig.8.
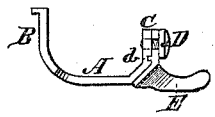  
Fig.9. Fig.10. Fig.11.
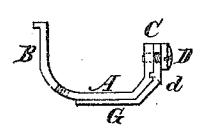 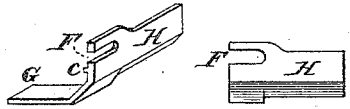  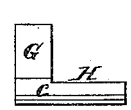
Fig.12. Fig.13. Fig.14. Fig.15.
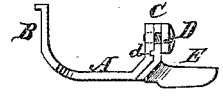 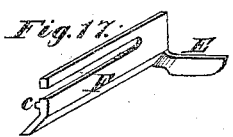 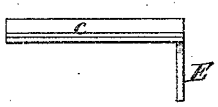
Fig.16. Fig.17. Fig.18.
Witnesses.
Galen C. Hyatt
Roley E. Wilhoit
Inventor:
George Vincent

UNITED STATES PATENT OFFICE.

GEORGE VINCENT, OF STOCKTON, CALIFORNIA.

IMPROVEMENT IN PRESSER-FOOT ATTACHMENTS FOR SEWING-MACHINES.

Specification forming part of Letters Patent No. 134,497, dated December 31, 1872.

*To all whom it may concern:*

Be it known that I, GEORGE VINCENT, of the city of Stockton, county of San Joaquin, and State of California, have invented certain Improvements in Presser-Feet for Sewing-Machines, of which the following is a specification:

Description of Accompanying Drawing.

Figure 1 is a side view of my cloth-presser. Fig. 2 is a top view of same. Fig. 3 is a perspective view of same. Fig. 4 is an end view of same from right of Fig. 1. Fig. 5 is an end view of same from left of Fig. 1. Fig. 6 is a side view of presser with gatherer attached. Fig. 7 is a perspective view of gatherer. Fig. 8 is a top view of same. Fig. 9 is a side view of presser with right-and-left edge-stitching gage attached. Fig. 10 is a perspective view of right-and-left gage. Fig. 11 is a top view of same. Fig. 12 is a side view of presser with binder-gage attached. Fig. 13 is a perspective view of binder-gage. Fig. 14 is an end view of same from the right of Fig. 12. Fig. 15 is a top view of same. Fig. 16 is a side view of presser with broad gage attached. Fig. 17 is a perspective view of broad gage. Fig. 18 is a top view of same.

Nature and Objects of my Invention.

My invention relates to the construction of presser-feet of sewing-machines so that the adjustable gages or guides which are used for different kinds of sewing may be attached to the cloth-presser instead of to the bed-plate or table, or to the rigid arm of the machine, and in such a manner that they shall be close to the needle-hole and still not occupy the space between the cloth-presser and the bridge or table, which is usually only sufficient to allow of the passage of the work to be done, and when any gage or guide is attached to the under side of the cloth-presser it brings an undue pressure upon the cloth or other material being worked, thereby retarding its feeding motion and shortening the stitches; and if the gage or guide is attached to the table, or to the rigid arm, the pressure upon the material is the same when feeding as when not feeding, and is open to the same objection, while, by attaching the gage or guide to the cloth-presser, as in my invention, in such a manner as not to occupy any of the space between the cloth-presser and the bridge, the gage or guide rises with the cloth-presser at the operation of the feed, and offers no more impediment to the passage of the material than does the original cloth-presser.

Construction and Operation of my Invention.

I construct my presser-foot A, as shown in the accompanying drawing, of the usual material, with the flange B and the slotted hole $a$, for the purpose of attaching it by a single screw to the presser-rod of the machine. In front of the needle-hole $b$ the plate curves upward (to allow the material being sewed to pass under it easily) so as to form an upright flange or lug, C, to which the gages or guides used for different kinds of sewing are attached by the screw D, the flange or lug C having horizontally across its face a groove, $d$, to receive a corresponding tongue or rib, $c$, on the gage or guide to keep the same in a horizontal position and still allow it to be moved horizontally, as may be required. The gatherer, Figs. 6, 7, and 8, is a metal plate attached to the flange C by the screw D, through the slot F, and having upon its inner side a tongue or rib, $c'$, to fit in the groove $d$. The plate curves under the front of the cloth-presser and extends back to the needle-hole $b$. The right-and-left edge-gage, Figs. 9, 10, and 11, is a plate of the same width as the presser, and fitted to the curved front of same, but extending no lower than a line horizontal with the lower side of presser, and is secured to presser in the same manner as the gatherer. On the extreme edge, opposite the operator, it has a gage-point, E, extending in front and curved upward at the point. When the gage is adjusted evenly with the presser the gage-point E is at the proper distance beyond the line of the needle from the operator for edge-stitching, and when the gage is moved toward the operator as far as the screw D and the slot F will allow the gage-point E is the same distance from the line of the needle, but on the opposite side. The binder-gage, Figs. 12, 13, 14, and 15, is for use with Vincent's patent binder, and is attached to cloth-presser in the same manner as the gatherer and right-and-left gage. It has a guiding plate or flange, G, somewhat narrower than the distance from the needle-hole to the edge of the presser, next the operator, and extending under the presser back of the needle-hole, and which can be adjusted at such distance from the needle as may be desired for different widths of binding, by means of the screw D in the slot F. The upright flange H, by which it is secured to the cloth-presser, extends beyond the line of the needle, on the side opposite the operator, a sufficient distance to prevent the work from curling up from the operation of binding. This extension of the flange H is no lower than the bottom of the cloth-presser. The broad gage, Figs. 16, 17, and 18, for stitching parallel lines, is attached and constructed in the same manner as the right-and-left gage, Figs. 9, 10, and 11, except it is made of any desired width by extending it on the side next the operator.

The gatherer is intended for gathering and sewing at the same time, and in its operation is the same as several well-known devices in use for the same purpose, but differing in the manner of attaching.

The right-and-left gage can be used for edge-stitching, working equally well from either edge, or it can be used for parallel stitching, guiding from a line of stitching or from a pencil-mark. It being the same width as the cloth-presser, and having nothing extending sidewise from it, it will pass as readily over plaits, puffing, &c., as the original presser. The slot and screw being constructed with special reference to the adjustment of the gage-point, as hereinbefore described, it is readily adjusted for stitching from either edge.

The binder-gage, by the manner of attaching it, must be parallel with the line of the needle, at any distance at which it may be set. The projecting flange H, being no lower than the cloth-presser, it allows the guiding-flange to be made much thicker, thus making a much more efficient guide than heretofore used with Vincent's patent binder.

The broad gage is used for stitching parallel lines, quilting, and similar work.

Claim.

What I claim as new and of my invention, and wish to secure by Letters Patent, is—

The presser-foot having the upturned flange or toe and groove $d$, combined with a guide or other attachment provided with a tongue or rib, C, and adapted to fit and be secured to the flange or toe of the presser by a set-screw, as and for the purpose described.

GEORGE VINCENT.

Witnesses:
GALEN C. HYATT,
ROLEY E. WILHOIT.